United States Patent
Yiu et al.

(10) Patent No.: US 9,800,395 B2
(45) Date of Patent: Oct. 24, 2017

(54) SYSTEMS AND METHODS FOR SIGNALING IN AN INCREASED CARRIER MONITORING WIRELESS COMMUNICATION ENVIRONMENT

(71) Applicant: Intel IP Corporation, Santa Clara, CA (US)

(72) Inventors: Candy Yiu, Portland, OR (US); Yang Tang, Pleasanton, CA (US); Rui Huang, Beijing (CN)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/452,153

(22) Filed: Mar. 7, 2017

(65) Prior Publication Data

US 2017/0180106 A1    Jun. 22, 2017

Related U.S. Application Data

(63) Continuation of application No. 14/704,848, filed on May 5, 2015, now Pat. No. 9,635,574.

(Continued)

(51) Int. Cl.
*H04L 5/14* (2006.01)
*H04W 24/08* (2009.01)

(52) U.S. Cl.
CPC .............. *H04L 5/14* (2013.01); *H04W 24/08* (2013.01)

(58) Field of Classification Search
CPC ................................. H04L 5/14; H04W 24/08
See application file for complete search history.

(56) References Cited

U.S. PATENT DOCUMENTS

| 8,842,633 B2 * | 9/2014 | Dwyer .............. H04W 36/0083 370/331 |
| 2011/0053513 A1 | 3/2011 | Papakostas et al. |

(Continued)

FOREIGN PATENT DOCUMENTS

| TW | 201136236 A1 | 10/2011 |
| TW | 201342858 A1 | 10/2013 |

OTHER PUBLICATIONS

Ericsson, "Introduction of increased number of frequencies to monitor," 3GPP TSG-RAN2 Meeting #88, R2-145356, Version 12.3.0, Nov. 17-21, 2014, San Francisco, USA, 37 pages.

(Continued)

*Primary Examiner* — Duc C Ho
(74) *Attorney, Agent, or Firm* — Schwabe, Williamson & Wyatt, P.C.

(57) ABSTRACT

Systems and methods for signaling in an increased carrier monitoring wireless communication environment are disclosed herein. In some embodiments, a user equipment (UE) may include control circuitry to configure the UE for increased carrier monitoring; determine, based on a first signal received from a network apparatus, whether a reduced performance group carrier is configured; determine, based on a second signal received from the network apparatus, whether a scaling factor is configured; and in response to a determination that no reduced performance group carrier is configured and a determination that no scaling factor is configured, allow the UE to monitor fewer carriers than required by increased carrier monitoring. Other embodiments may be disclosed and/or claimed.

26 Claims, 5 Drawing Sheets

Related U.S. Application Data

(60) Provisional application No. 62/082,004, filed on Nov. 19, 2014.

(56) References Cited

U.S. PATENT DOCUMENTS

| | | | | |
|---|---|---|---|---|
| 2013/0109372 | A1* | 5/2013 | Ekici | H04W 24/02 455/422.1 |
| 2015/0334553 | A1* | 11/2015 | Yang | H04L 1/1854 455/552.1 |
| 2016/0050576 | A1* | 2/2016 | Dalsgaard | H04L 27/2601 370/252 |
| 2016/0269919 | A1* | 9/2016 | Kazmi | H04W 36/0094 |

OTHER PUBLICATIONS

Ericsson et al., "Requirements for increased carrier monitoring in RRC connected state 36.133," 3GPP TSG-RAN WG4 Meeting #73, R4-147914, Verion 12.5.0, Oct. 17-21, 2014, San Francisco, USA, 34 pages.

Ericsson et al., "Requirements for increased carrier monitoring in cell FACH and cell DCH state 25.133," 3GPP TSG-RAN WG4 Meeting #73, R4-147867, Verion 12.5.0, Nov. 17-21, 2014, San Francisco, USA, 23 pages.

3GPP, "Requirements for support of radio resource management (FDD) (Release 12)," 3GPP TS 25.133 V12.5.0 (Sep. 2014), 356 pages.

3GPP, "Evolved Universal Terrestrial Radio Access (E-UTRA); Radio Resource Control (RRC); Protocol specification (Release 12)," 3GPP TS 36.331 V12.3.0 (Sep. 2014), LTE Advanced, 378 pages.

3GPP, "Radio Resource Control (RRC); Protocol specification (Release 12)," 3GPP TS 25.331 V12.3.0 (Sep. 2014), 2204 pages.

3GPP, Requirements for support of radio resource management (Release 12), 3GPP TS 36.133 V12.5.0 (Sep. 2014), Lte Advanced, 877 pages.

International Search Report and Written Opinion mailed on Jan. 19, 2016 for International Application No. PCT/US2015/056011; 13 pages.

Ericsson; "Requirements for increased carrier monitoring in cell FACH and cell DCH state 25.133"; 3GPP TSG-RAN WG4 Meeting #73; San Francisco, USA, Nov. 17-21, 2014; R4-147463; 19 pages.

Ericsson; "Details of increased carrier monitoring specific to E-UTRA"; 3GPP TSG-RAN WG4 Meeting #71; R4-143244; Agenda Item: 7.9.3; Seoul, Korea, May 19-24, 2014; 6 pages.

Samsung; "Remaining issues on increased carrier monitoring"; 3GPP TSG-RAN WG4 Meeting #87; R2-143514; Agenda item: 5.2; Dresden, Germany, Aug. 18-22, 2014; 3 pages.

Taiwan Office Action for Application No. 104133706 mailed on Oct. 4, 2016; 10 pages.

* cited by examiner

SYSTEMS AND METHODS FOR SIGNALING IN AN INCREASED CARRIER MONITORING WIRELESS COMMUNICATION ENVIRONMENT

CROSS-REFERENCE TO RELATED APPLICATION

This application is a continuation of U.S. patent application Ser. No. 14/704,848, filed May 5, 2015, which claims the benefit of U.S. Provisional Application No. 62/082,004, filed Nov. 19, 2014, entitled "INCMON FEATURE UE BEHAVIOUR," the content and disclosure of both of which are hereby incorporated by reference in their entireties.

FIELD

Embodiments of the present disclosure generally relate to the field of wireless communication, and more particularly, to systems and methods for signaling in an increased carrier monitoring wireless communication environment.

BACKGROUND

Some wireless communication protocols require user equipment to measure a certain number of carriers, and newer protocols may require some user equipment to measure more carriers than were required by older protocols. For example, a user equipment (UE) in a Release 11 Long Term Evolution (LTE) environment may be required to monitor only three Universal Terrestrial Radio Access (UTRA) frequency division duplex (FDD) carriers, while a user equipment in a Release 12 LTE environment may be required to monitor at least six UTRA FDD carriers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
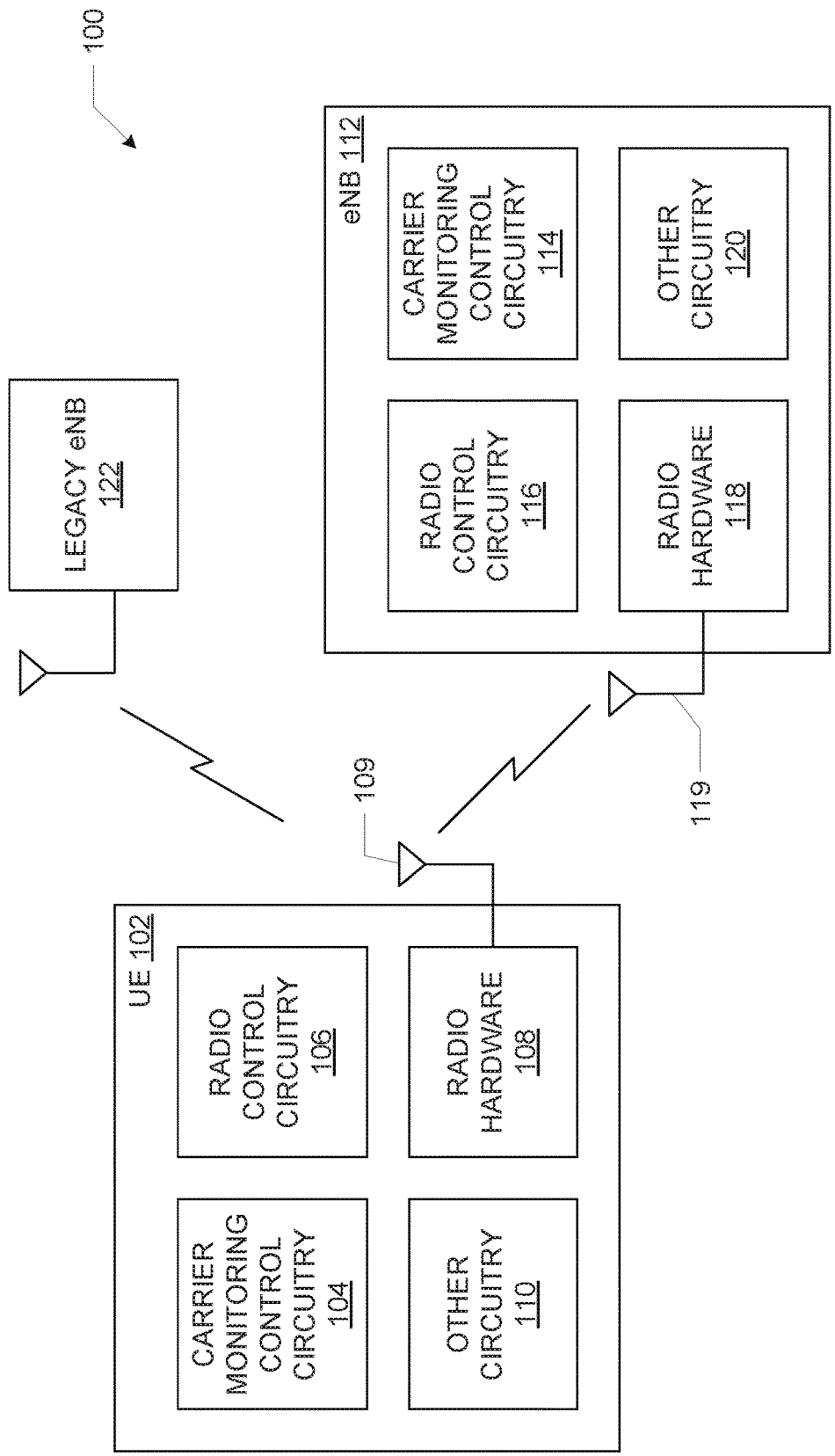
FIG. 1 is a block diagram of a portion of a wireless communication environment in accordance with various embodiments.

Embodiments of the present disclosure include systems and methods for signaling in an increased carrier monitoring environment. A user equipment (UE) (such as a smartphone or other mobile communications device) may interact with many different types of wireless communication networks as it moves through time and space. As new functions (such as increased carrier monitoring, discussed below) are included in newer network specifications, a UE configured to perform such new functions may find the functions not recognized or otherwise not supported by older or different network specifications. If the older or different network specifications did not anticipate the newer functions, a UE interacting with such an older or different network may not receive the network signals regarding the functions that it expects to receive, and therefore may not know whether or not to perform the functions. Adding additional function-specific signaling between the newer network and the UE may help address the ambiguity, but at the cost of additional signaling overhead. As wireless communication network specifications continue to be refined to be as lean and efficient with communication resources as possible, such additional cost may be unacceptable.

Various ones of the embodiments disclosed herein may address these issues by configuring UEs and the network components with which they interact (e.g., an eNB) to utilize particular combinations of existing signaled data to communicate whether or not a UE should or should not follow the requirements of increased carrier monitoring. These embodiments may mitigate or eliminate situations in which a UE has unclear or conflicting instructions on whether or not increased carrier monitoring should be performed while incurring no or minimal signaling overhead.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the term "or" is used as an inclusive term to mean at least one of the components coupled with the term. For example, the phrase "A or B" means (A), (B), or (A and B); and the phrase "A, B, or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality.

FIG. 1 schematically illustrates a wireless communication environment 100 in accordance with various embodiments. The environment 100 may include a user equipment (UE) 102 that is capable of communicating over one or more wireless communication networks. For example, the UE 102 may be configured to communicate over a cellular network and a wireless local area network (WLAN). The cellular network may utilize any suitable radio access technology (RAT), such as universal terrestrial radio access (UTRA) in accordance with a 3rd Generation Partnership Project (3GPP) universal mobile telecommunications system (UMTS) protocol or evolved UTRA (E-UTRA) in accordance with a 3GPP Long Term Evolution (LTE) protocol. The UE 102 may include carrier monitoring control circuitry 104 coupled with radio hardware 108 via a radio control circuitry 106. The carrier monitoring control circuitry 104 may control carrier monitoring-related operations of the UE 102. The radio control circuitry 106 may include circuitry for receiving signals from the radio hardware 108 for processing by the carrier monitoring control circuitry 104 and/or circuitry for providing signals to the radio hardware 108 from the carrier monitoring control circuitry 104. In some embodiments, the radio control circuitry 106 may be provided by computer-readable instructions, stored in one or more computer-readable media, that may be executed by one or more processing devices included in the carrier monitoring control circuitry 104. The UE 102 may use the radio hardware 108 to wirelessly communicate with one or more other devices in the wireless communication environment 100 (e.g., the eNB 112, discussed below). The radio hardware 108 may include any suitable conventional hardware for performing wireless communications (e.g., an antenna 109), such as radio transmit circuitry and receive circuitry. In some embodiments, transmit and/or receive circuitry of the radio hardware 108 may be elements or modules of transceiver circuitry. The UE 102 may include other circuitry 110, which may perform any suitable functions (a number of examples of which are discussed herein).

The wireless communication environment 100 may also include an eNB (which may also be referred to as an "evolved NodeB" or an "eNodeB") 112 that may be part of a cellular network as discussed above. The eNB 112 may serve as the intermediary between one or more UEs (e.g., the UE 102) and a backbone network of the wireless communication environment 100. The geographic area over which the eNB 112 may provide such service may be referred to as the cell associated with the eNB 112. When the UE 102 is receiving such service from the eNB 112, the UE 102 may be referred to as being within the serving cell of the eNB 112. The eNB 112 may include carrier monitoring control circuitry 114 coupled with radio hardware 118 via a radio control circuitry 116. The carrier monitoring control circuitry 114 may control carrier monitoring-related operation of the eNB 112. The radio control circuitry 116 may include circuitry for receiving signals from the radio hardware 118 for processing by the carrier monitoring control circuitry 114 and/or circuitry for providing signals to the radio hardware 118 from the carrier monitoring control circuitry 114. In some embodiments, the radio control circuitry 116 may be provided by computer-readable instructions, stored in one or more computer-readable media, that may be executed by one or more processing devices included in the carrier monitoring control circuitry 114. The eNB 112 may use the radio hardware 118 to wirelessly communicate with one or more other devices in the wireless communication environment 100 (e.g., the UE 102). The radio hardware 118 may include any suitable conventional hardware for performing wireless communications (e.g., an antenna 119), such as radio transmit circuitry and receive circuitry. In some embodiments, transmit and/or receive circuitry of the radio hardware 118 may be elements or modules of transceiver circuitry. The eNB 112 may include other circuitry 120, which may perform any suitable functions, such as wired or wireless communication with a network controller (not shown).

The wireless environment 100 may also include a legacy eNB 122. The legacy eNB 122 may operate in accordance with a previous release of the UMTS protocol or a previous release of the LTE protocol (e.g., Release 11). At various times, the UE 102 may be in communication with the legacy eNB 122.

Although a single UE 102 and a single eNB 112 are depicted in FIG. 1, this is simply for ease of illustration, and the wireless environment 100 may include one or more UEs configured as described herein with reference to the UE 102 and one or more eNBs configured as described herein with reference to the eNB 112. For example, the UE 102 may be configured for communication with one or more eNBs configured as described herein with reference to the eNB 112 (and for communication with one or more legacy eNBs configured as described herein with reference to the legacy eNB 122), and the eNB 112 may be configured for communication with more than one UE configured as described herein with reference to the UE 102.

The carrier monitoring control circuitry 104 may be configured to cause the UE 102 to detect, synchronize, and monitor intra-frequency, inter-frequency, and inter-RAT cells. These cells may be indicated in the measurement control system information of the serving cell and provided to the UE 102 by the eNB (e.g., the eNB 112). The UE 102 may use this information for, for example, cell re-selection.

The carrier monitoring control circuitry 104 of the UE 102 may be configured to support increased carrier monitoring by the UE 102. As used herein "increased carrier monitoring" may refer to the monitoring of more carriers that was required in previous releases of the UMTS or LTE protocols. Table 1 below summarizes an example of the increased number of carriers of various types for a UE that supports increased carrier monitoring UTRA (using the UMTS protocol), and Table 2 below summarizes an example of the increased number of carriers of various types for a UE that supports increased carrier monitoring E-UTRA (using the LTE protocol).

TABLE 1

Increased carrier monitoring requirements for a UE that supports increased carrier monitoring UTRA.

| UMTS | Previous # of Carriers | Increased # of Carriers |
|---|---|---|
| UTRA FDD | 2 | 4 |
| LTE FDD/TDD | 4 | 8 |

TABLE 2

Increased carrier monitoring requirements for a UE that supports increased carrier monitoring E-UTRA.

| LTE | Previous # of Carriers | Increased # of Carriers |
|---|---|---|
| UTRA FDD | 3 | 6 |
| UTRA TDD | 3 | 7 |
| LTE FDD/TDD | 3 | 8 |

In some embodiments, a UE that is not performing increased carrier monitoring may, when in the Dedicated Channel (CELL_DCH) state and a single uplink carrier frequency is configured, be required to be able to monitor up to 32 intra-frequency division duplex (FDD) cells (including in active set); 32 inter-frequency cells, including FDD cells distributed on up to 2 additional FDD carriers, and, depending on UE capability, time division duplex (TDD) cells distributed on up to 3 TDD carriers; depending on UE capability, 32 Global System for Mobile Communications (GSM) cells distributed on up to 32 GSM carriers; depending on UE capability, 4 E-UTRA FDD cells per E-UTRA FDD carrier for up to 4 E-UTRA FDD carriers; depending on UE capability, 4 E-UTRA TDD cells per E-UTRA TDD carrier for up to 4 E-UTRA TDD carriers; and, depending on UE capability, up to 16 intra frequency cells during Idle Period in the Downlink (IPDL) gaps. In addition to these requirements, in some embodiments, a UE supporting E-UTRA measurements, but that is not performing increased carrier monitoring, shall be capable of monitoring a minimum total of at least 8 carrier frequency layers, including the intra-frequency serving layer and including any combination of E-UTRA FDD, E-UTRA TDD, UTRA FDD, UTRA TDD, and GSM layers as discussed above (one GSM layer corresponds to 32 cells).

In some embodiments, a UE that is not performing increased carrier monitoring may, when in the CELL_DCH state and dual uplink carrier frequencies are configured, be required to be able to monitor up to 32 intra frequency FDD cells (including in active set) per intra-frequency carrier, 32 inter_frequency cells, including FDD cells distributed on up to 2 additional FDD carriers and, depending on UE capability, TDD cells, distributed on up to 3 TDD carriers; depending on UE capability, 32 GSM cells distributed on up to 32 GSM carriers; depending on UE capability, 4 E-UTRA FDD cells per E-UTRA FDD carrier for up to 4 E-UTRA FDD carriers; depending on UE capability, 4 E-UTRA TDD cells per E-UTRA TDD carrier distributed on up to 4 E-UTRA TDD carriers; and, depending on UE capability, up to 16 intra-frequency cells during IPDL gaps. In addition to these requirements, in some embodiments, a UE supporting E-UTRA measurements, but that is not performing increased carrier monitoring, shall be capable of monitoring a minimum total of at least 9 carrier frequency layers, including the two intra-frequency carriers and including any combination of E-UTRA FDD, E-UTRA TDD, UTRA FDD, UTRA TDD, and GSM layers discussed above (one GSM layer corresponds to 32 cells).

In some embodiments, a UE that is not performing increased carrier monitoring may, when in the Cell Forward Access Channel (CELL_FACH) state, be required to be able to monitor up to 32 intra-frequency FDD cells and 32 inter-frequency cells, including FDD cells distributed on up to 2 additional FDD carriers; depending on UE capability, TDD mode cells, distributed on up to 3 TDD carriers; depending on UE capability, 32 GSM cells distributed on up to 32 GSM carriers; depending on UE capability, up to 4 E-UTRA FDD carriers; depending on UE capability, up to 4 E-UTRA TDD carriers; and, depending on UE capability, up to 16 intra-frequency cells during IPDL gaps.

By contrast, in some embodiments, a UE that indicates support for increased carrier monitoring UTRA may additionally be capable of monitoring at least 80 inter-frequency cells, including 5 FDD UTRA inter-frequency carriers with up to 32 cells per carrier. In some embodiments, a UE that indicates support for increased UE carrier monitoring E-UTRA shall be capable of monitoring at least, depending on UE capability, 8 FDD E-UTRA carriers, and, depending on UE capability, 8 TDD E-UTRA carriers. Additionally, in some embodiments, a UE supporting E-UTRA measurements and supporting increased carrier monitoring UTRA or increased carrier monitoring E-UTRA may, when High Speed Downlink Shared Channel (HS-DSCH) discontinuous reception is ongoing, be capable of monitoring a total of at least 13 carrier frequency layers, which includes a serving layer, including any combination of E-UTRA FDD, E-UTRA TDD, UTRA FDD, UTRA TDD and GSM layers as discussed above (one GSM layer corresponds to 32 cells).

When the UE 102 supports increased carrier monitoring (e.g., in UTRA or E-UTRA), and the eNB 112 recognizes such increased carrier monitoring, the set of inter-frequency carriers or inter-RAT carriers may be divided into two groups. The group that has a better delay performance compared to the other group is referred to as the normal performance group (NPG) and the group that has worse delay performance compared to the other group is referred to as the reduced performance group (RPG). Table 3 below summarizes an example of the maximum number of carriers of various types that may be included in an NPG for a UE that supports increased carrier monitoring UTRA (using the UMTS protocol), and Table 4 below summarizes an example of the maximum number of carriers of various types that may be included in an NPG for a UE that supports increased carrier monitoring E-UTRA (using the LTE protocol). The values in Tables 3 and 4 may apply when the UE 102 is in connected mode (e.g., in the Radio Resource Control Connected state (RRC_CONNECTED), in the Cell Dedicated Channel state (CELL_DCH), or in the Cell Forward Access Channel state (CELL_FACH)).

TABLE 3

Increased carrier monitoring requirements for a UE that supports increased carrier monitoring UTRA.

| UMTS | # Carriers in NPG |
|---|---|
| UTRA FDD | ≤2 |
| LTE FDD/TDD | ≤4 |

TABLE 4

Increased carrier monitoring requirements for a UE that supports increased carrier monitoring E-UTRA.

| LTE | # Carriers in NPG |
|---|---|
| UTRA FDD | ≤3 |
| UTRA TDD | ≤3 |
| LTE FDD/TDD | ≤3 |

The carrier monitoring control circuitry 104 may apply different performance requirements for various operations to NPG cells and to RPG cells. For example, when the UE 102 is configured for increased carrier monitoring, the carrier monitoring control circuitry 104 may be configured to identify a new detectable cell belonging to a monitored set (the "performance delay requirement") within $$T_{identify,inter} = T_{basic\ identify\ FDD,inter} \cdot \frac{T_{Measurement\ Period,Inter}}{T_{Inter}} \cdot K_n \cdot N_{Freq,n}\ \text{ms} \quad (1)$$

for a carrier within an NPG, and may be configured to identify a new detectable cell belonging to a monitored set within $$T_{identify,inter} = T_{basic\ identify\ FDD,inter} \cdot \frac{T_{Measurement\ Period,Inter}}{T_{Inter}} \cdot K_r \cdot N_{Freq,r}\ \text{ms} \quad (2)$$

for a carrier within an RPG, wherein $T_{basic\ identify\ FDD,inter}$ may be 300 ms (or another suitable value), $T_{Measurement\ Period,\ Inter}$ may be 480 ms (or another suitable value); $T_{Inter}$ may be the minimum time available for inter-frequency measurements; $N_{Freq,n}$ may be the number of carriers to be searched for and measured with normal performance; $N_{Freq,r}$ may be the number of carriers to be searched for and measured with reduced performance; $K_n$ may be equal to 1 if $N_{Freq,r}$ is zero (i.e., all carriers to be searched for and measured are in the NPG) and may be equal to S/(S−1) if $N_{Freq,r}$ is non-zero, where S is a scaling factor; and $K_r$ may be equal to S if $N_{Freq,r}$ is not equal to zero. The scaling factor S may define the relaxation to be applied to the requirements for carriers measured with reduced measurement performance, and may be signalled by higher layers.

These are simply examples, and the carrier monitoring control circuitry 104 may treat NPG carriers and RPG carriers differently in a number of ways (including those discussed elsewhere herein). The legacy eNB 122 may not be configured to recognize increased carrier monitoring by the UE 102 (e.g., because the legacy UMTS or LTE protocol did not include or recognize increased carrier monitoring). For example, instead of expecting the UE 102 to perform measurements for identifying a new detectable cell in accordance with Eqs. 1 and 2 above, the legacy eNB 122 may expect the UE 102 to perform measurements for identifying a new detectable cell in accordance with $$T_{identify,inter} = T_{basic\ identify\ FDD,inter} \cdot \frac{T_{Measurement\ Period,Inter}}{T_{Inter}} \cdot N_{Freq,legacy}\ \text{ms} \qquad (3)$$

where $N_{Freq}$ may be the number of carriers to be searched for and measured in accordance with the legacy protocol.

However, in conventional systems, a UE may not know whether a serving eNB supports increased carrier monitoring or does not support increased carrier monitoring when all carriers are NPG (and thus no carriers are indicated as RPG). This may lead to performance failures, as the conventional UE that supports increased carrier monitoring will not know, for example, that the UE is required to monitor 8 FDD carriers when the serving eNB supports increased carrier monitoring and is only required to monitor 3 FDD carrier when the serving eNB does not support increased carrier monitoring. In another example, performance failures may occur if the UE does not know the period within which a new detectable cell belonging to a monitored set may be identified (e.g., whether Eqs. (1) and (2) should be applied, or Eq. (3) should be applied).

In a first set of embodiments, these issues may be addressed by requiring the carrier monitoring control circuitry 114 of the eNB 112 to configure at least one RPG carrier when the UE 102 is first served by the cell associated with the eNB 112. By signaling to the UE 102 that there is at least one RPG carrier, the eNB 112 may indicate to the UE 102 that the eNB 112 supports increased carrier monitoring, and thus that, for example, Eqs. 1 and 2 should be used. If the eNB 112 does not intend for any carriers to be treated as RPG, the carrier monitoring control circuitry 114 may subsequently change the configuration to signal to the UE 102 that all carriers are NPG (after the UE 102 has received the previous RPG indication and thus concluded that the eNB 112 supports increased carrier monitoring).

In a second set of embodiments, the issues identified above may be addressed by requiring the carrier monitoring control circuitry 114 of the eNB 112 to configure at least one RPG carrier when the UE 102 is first served by the cell associated with the eNB 112, and also to configure the scaling factor to define the relaxation to be applied to the requirements for RPG carriers. By signaling the scaling factor to the UE 102, the eNB 112 may indicate to the UE 102 that the eNB 112 supports increased carrier monitoring, and thus that, for example, Eqs. 1 and 2 should be used. If, as discussed above with reference to the first set of embodiments, the eNB 112 does not intend for any carriers to be treated as RPG, the carrier monitoring control circuitry 114 may subsequently change the configuration to signal to the UE 102 that all carriers are NPG (after the UE 102 has received the scaling factor indication and thus concluded that the eNB 112 supports increased carrier monitoring).

In a third set of embodiments, the issues identified above may be addressed by configuring the UE 102 and the eNB 112 to utilize the scaling factor as an indicator of whether increased carrier monitoring should or should not be performed when all carriers are NPG, without having to initially configure a carrier as RPG. When the UE 102 detects the presence of the scaling factor in a communication from the eNB 112 when all carriers are NPG, the carrier monitoring control circuitry 104 may interpret this condition as indicating that the eNB 112 supports increased carrier monitoring, and may apply Eq. 1 (which, when there are no RPG carriers configured, does not depend on the scaling factor). In the second and third sets of embodiments, since the scaling factor communicates information about the relaxation to be applied to measurement requirements for RPG carriers, using the scaling factor to communicate additional information may be a form of implicit signaling, and may have the advantage of not requiring much or any additional data to be communicated between an eNB and a UE.

Table 5 below illustrates a portion of an example system information block that may be used by the carrier monitoring control circuitry 114 of the eNB 112 to signal carrier information to the UE 102, in accordance with some embodiments. As shown in Table 5, an information element reducedMeasurementPerformance-r12 is indicated as "OPTIONAL Need OR," which means that the information element is optional for the eNB 112 to signal, but if the message is received by the UE 102 and the information element is absent, the UE 102 shall discontinue/stop using/delete any existing value (and/or the associated functionality). In the example of Table 5, the information elements InterFreqCarrierFreqInfo-v12xy and InterFreqCarrierFreqInfo-r12 may act as different ways for the eNB 112 to indicate the RPG carriers and may be included for compatibility reasons.

TABLE 5

System Information Block Type 6 information element.

```
InterFreqCarrierFreqInfo-v12xy ::=    SEQUENCE {
        reducedMeasurementPerformance-r12    ENUMERATED {true}    OPTIONAL
        -- Need OR
}
```

TABLE 5-continued

System Information Block Type 6 information element.

```
...
InterFreqCarrierFreqInfo-r12 ::=    SEQUENCE {
    dl-CarrierFreq-r12                  ARFCN-ValueEUTRA-r9,
    q-RxLevMin-r12                      Q-RxLevMin,
    p-Max-r12                           P-Max                   OPTIONAL,        --
Need OP
    t-ReselectionEUTRA-r12              T-Reselection,
    t-ReselectionEUTRA-SF-r12           SpeedStateScaleFactors          OPTIONAL,
    -- Need OP
    threshX-High-r12                    ReselectionThreshold,
    threshX-Low- If the measId-v12xy is included12
ReselectionThreshold,
    allowedMeasBandwidth-r12            AllowedMeasBandwidth,
    presenceAntennaPort1-r12            PresenceAntennaPort1,
    cellReselectionPriority-r12         CellReselectionPriority         OPTIONAL,
    -- Need OP
    neighCellConfig-r12                 NeighCellConfig,
    q-OffsetFreq-r12                    Q-OffsetRange                   DEFAULT dB0,
    interFreqNeighCellList-r12          InterFreqNeighCellList          OPTIONAL,
    -- Need OR
    interFreqBlackCellList-r12          InterFreqBlackCellList          OPTIONAL,
    -- Need OR
    q-QualMin-r12                       Q-QualMin-r9                    OPTIONAL,       --
Need OP
    threshX-Q-r12                       SEQUENCE {
        threshX-HighQ-r12                   ReselectionThresholdQ-r9,
        threshX-LowQ-r12                    ReselectionThresholdQ-r9
    }                                                                   OPTIONAL,    -- Cond
RSRQ
    q-QualMinWB-r12                     Q-QualMin-r9                    OPTIONAL, -
- Cond WB-RSRQ
    multiBandInfoList-r12               MultiBandInfoList-r11           OPTIONAL,    -- Need
OR
    reducedMeasurementPerformance-r12 ENUMERATED {true}
        OPTIONAL,    -- Need OR
...
}
```

Table 6 below illustrates an example information element that may be used by the carrier monitoring control circuitry 114 of the eNB 112 to signal measurements to be performed by the UE 102, including intra-frequency, inter-frequency, and inter-RAT mobility measurements, as well as configuration of measurement gaps. As shown in Table 6, an information element measScaleFactor-r12 is indicated as "OPTIONAL Need ON," which means that the information element that is optional for the eNB 112 to signal, but if the message is received by the UE 102 and the information element is absent, the UE 102 takes no action and, where applicable, shall continue to use the existing value (and/or the associated functionality). In some embodiments, the information element measScaleFactor-r12 may be indicated as "OPTIONAL Need OR" instead of "OPTIONAL Need ON." In some embodiments, the information element measScaleFactor-r12 may be indicated as NON-OPTIONAL instead of OPTIONAL. In Table 6, the information elements measIdToRemoveListExt-r12 and measIdToAddModListExt-r12 may be used by the network to add or remove measurement objects from the list (e.g., to signal the change to the UE 102).

TABLE 6

MeasConfig information element.

```
-- ASN1START
MeasConfig ::=                  SEQUENCE {
    -- Measurement objects
    measObjectToRemoveList          MeasObjectToRemoveList      OPTIONAL, -- Need ON
    measObjectToAddModList          MeasObjectToAddModList      OPTIONAL, -- Need ON
    -- Reporting configurations
    reportConfigToRemoveList        ReportConfigToRemoveList    OPTIONAL, -- Need ON
    reportConfigToAddModList        ReportConfigToAddModList    OPTIONAL, -- Need ON
    -- Measurement identities
    measIdToRemoveList              MeasIdToRemoveList          OPTIONAL, -- Need ON
    measIdToAddModList              MeasIdToAddModList          OPTIONAL, -- Need ON
    -- Other parameters
    quantityConfig                  QuantityConfig              OPTIONAL, -- Need ON
    measGapConfig                   MeasGapConfig               OPTIONAL, -- Need ON
    s-Measure                       RSRP-Range                  OPTIONAL, -- Need ON
    preRegistrationInfoHRPD         PreRegistrationInfoHRPD OPTIONAL, -- Need OP
    speedStatePars          CHOICE {
        release                         NULL,
        setup                           SEQUENCE {
```

TABLE 6-continued

MeasConfig information element.

```
            mobilityStateParameters        MobilityStateParameters,
            timeToTrigger-SF               SpeedStateScaleFactors
        }
    }                                                                OPTIONAL, -- Need ON
    ...,
    [[  measObjectToAddModList-v9e0       MeasObjectToAddModList-v9e0     OPTIONAL --
Need ON
    ]],
    [[  measScaleFactor-r12                MeasScaleFactor-r12   OPTIONAL, -- Need ON
        measIdToRemoveListExt-r12          MeasIdToRemoveListExt-r12       OPTIONAL, -- Need
ON
        measIdToAddModListExt-r12          MeasIdToAddModListExt-r12       OPTIONAL -- Need
ON
    ]]
}
MeasIdToRemoveList ::=              SEQUENCE (SIZE (1..maxMeasId)) OF MeasId
MeasIdToRemoveListExt-r12 ::=       SEQUENCE (SIZE (1..maxMeasId)) OF MeasId-v12xy
MeasObjectToRemoveList ::=          SEQUENCE (SIZE (1..maxObjectId)) OF MeasObjectId
ReportConfigToRemoveList ::=        SEQUENCE (SIZE (1..maxReportConfigId)) OF ReportConfigId
-- ASN1STOP
```

Table 7 below illustrates an example MeasScaleFactor-r12 information element that may be used by the carrier monitoring control circuitry 114 of the eNB 112 to signal the scaling factor to be used for scaling the measurement performance requirements when the UE 102 is configured with UTRA and E-UTRA frequencies for reduced measurement performance. In particular, the sf-Measurement field of the MeasScaleFactor-r12 information element may specify the factor used to scale the measurement performance for UTRA and E-UTRA frequencies, when applicable. In some embodiments, the information element MeasScaleFactor-r12 may be indicated as "OPTIONAL Need OR" instead of "OPTIONAL Need ON." In some embodiments, the information element MeasScaleFactor-r12 may be indicated as NON-OPTIONAL instead of OPTIONAL.

TABLE 7

MeasScaleFactor information element.

```
-- ASN1START
MeasScaleFactor-r12 ::=    SEQUENCE {
    sf-Measurement         ENUMERATED {sf8, sf16}    OPTIONAL    -
- Need OR
}
-- ASN1STOP
```

In some embodiments, the carrier monitoring control circuitry 114 of the eNB 112 may signal a designated "NONE" or other value for the scaling factor (e.g., in the sf-Measurement field of the MeasScaleFactor-r12 information element discussed above) to specify that all carriers are to be considered NPG, instead of providing an otherwise valid scaling factor value.

In some embodiments, the carrier monitoring control circuitry 114 of the eNB 112 may configure a scaling factor (e.g., in accordance with the MeasScaleFactor-r12 information element of Table 6) at a different time than the signaling of the carriers (e.g., in accordance with the System Information Block of Table 5). In other embodiments, the carrier monitoring control circuitry 114 of the eNB 112 may be required to configure the scaling factor and signal the carriers at the same time (e.g., by including scaling factor information in the InterFreqCarrierFreqInfo-r12 information element discussed above with reference to Table 5).

Figure 2:
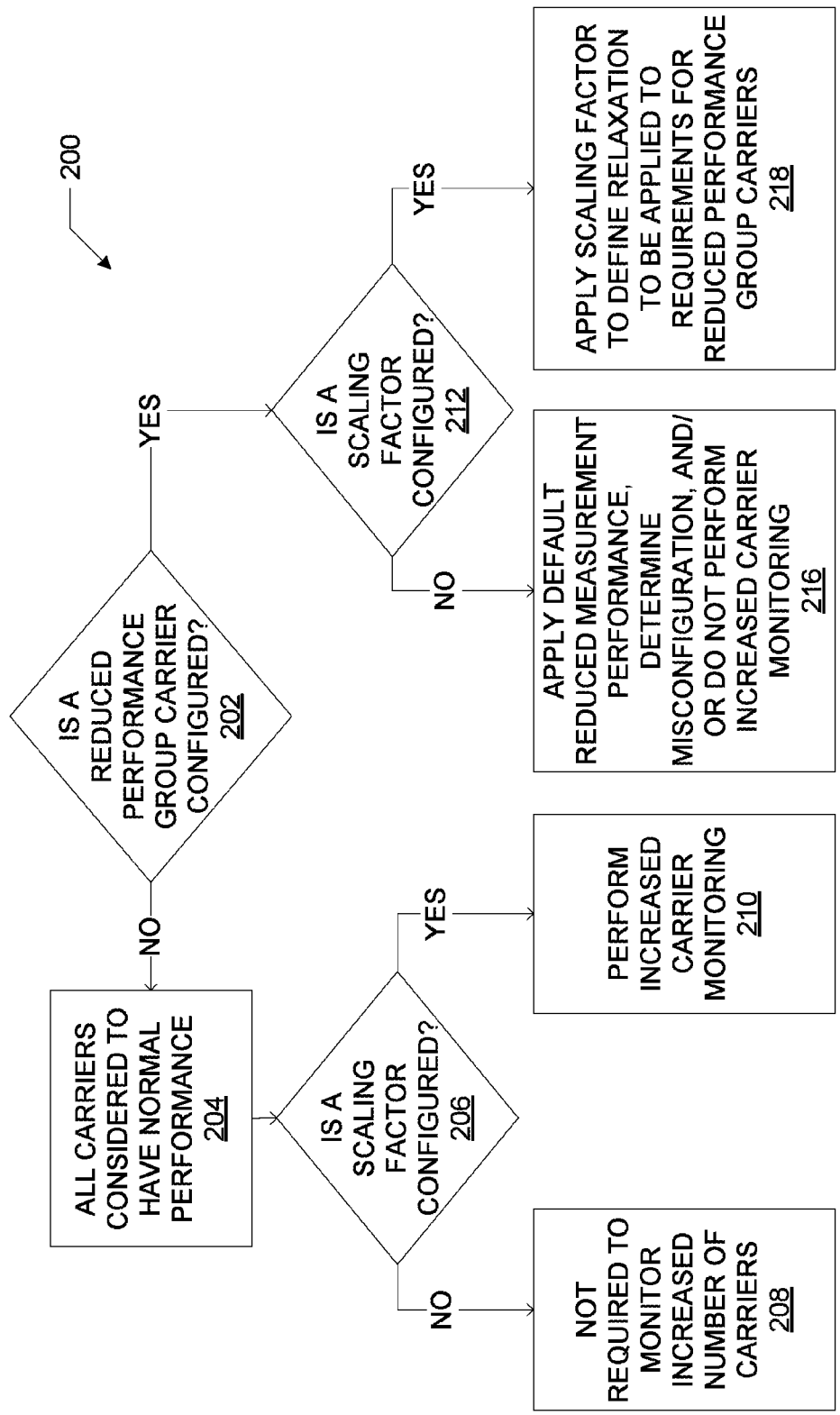
FIG. 2 is a flow diagram of a process for operating a UE in accordance with some embodiments.

FIG. 2 is a flow diagram of a process 200 for operating a UE. For ease of illustration, the process 200 may be discussed below with reference to the UE 102. It may be recognized that, while the operations of the process 200 (and the other processes described herein) are arranged in a particular order and illustrated once each, in various embodiments, one or more of the operations may be repeated, omitted, or performed out of order. For example, operations related to determining whether an RPG carrier is configured may be performed before, after, or in parallel with operations related to determining whether a scaling factor is configured. For illustrative purposes, operations of the process 200 may be described as performed by the carrier monitoring control circuitry 104 of the UE 102, but the process 200 may be performed by any suitably configured device (e.g., a programmed processing system, an ASIC, or another wireless computing device).

At 202, the carrier monitoring control circuitry 104 may determine whether an RPG carrier is configured (e.g., based on a signal provided by the eNB 112 or the legacy eNB 122). For example, if the UE 102 receives a System Information Block configured as described above with reference to the System Information Block of Table 5, the carrier monitoring control circuitry 104 may process the information contained therein to determine whether an RPG carrier is configured. In another example, if the UE 102 does not receive any signal from an eNB indicating that an RPG is configured, the carrier monitoring control circuitry 104 may determine that no RPG is configured.

If the carrier monitoring control circuitry 104 determines at 202 that no RPG carrier is configured, the carrier monitoring control circuitry 104 may determine that all carriers will be considered to have normal performance (e.g., be included in the NPG) at 204. The carrier monitoring control circuitry 104 may then determine whether a scaling factor is configured at 206. For example, if the UE 102 receives a MeasScaleFactor information element as described above with reference to the MeasScaleFactor information element of Table 7, the carrier monitoring control circuitry 104 may process the information contained therein to determine whether a scaling factor is configured. In another example, if the UE 102 does not receive any signal from an eNB indicating that a scaling factor is configured, the carrier monitoring control circuitry 104 may determine that no scaling factor is configured.

If the carrier monitoring control circuitry 104 determines at 206 that no scaling factor is configured, the carrier monitoring control circuitry 104 may determine at 208 that the UE 102 is not required to monitor an increased number of carriers and may instead monitor a "legacy" number of carriers. In some embodiments, this may occur when the eNB serving the UE 102 is the legacy eNB 122 and does not support increased carrier monitoring. Thus, if no RPG carrier is configured and no scaling factor is configured, a UE 102 that indicates support for increased carrier monitoring (E-UTRA or UTRA) may not be required to monitor the increased number of carriers specified by increased carrier monitoring.

If the carrier monitoring control circuitry 104 determines at 206 that a scaling factor is configured, the carrier monitoring control circuitry 104 may determine at 210 that the UE 102, which supports increased carrier monitoring, is to perform increased carrier monitoring.

Returning to 202, if the carrier monitoring control circuitry 104 determines at 202 that an RPG carrier is configured, the carrier monitoring control circuitry 104 may proceed to 212 and determine whether a scaling factor is configured.

If the carrier monitoring control circuitry 104 determines at 212 that no scaling factor is configured, the carrier monitoring control circuitry 104 may determine at 216 to perform any of a number of operations. In some embodiments, the carrier monitoring control circuitry 104 may, at 216, apply a set of default reduced measurement performance requirements to carriers in the RPG. These default reduced measurement performance requirements may be specified in a wireless communication specification (e.g., a 3GPP specification). For example, the carrier monitoring control circuitry 104 may use a previously signaled scaling factor. In some embodiments, the carrier monitoring control circuitry 104 may, at 216, determine that a network misconfiguration has occurred, and may signal to another component (e.g., an eNB) that a misconfiguration has taken place. In some embodiments, the carrier monitoring control circuitry 104 may, at 216, consider all carriers to be NPG due to the lack of a scaling factor (despite the determination at 202 that at least one RPG carrier is configured), and may not follow increased carrier monitoring performance requirements.

If the carrier monitoring control circuitry 104 determines at 212 that a scaling factor is configured, the carrier monitoring control circuitry 104 may determine at 218 that the scaling factor is to be applied to define the relaxation to be applied to requirements for RPG carriers (e.g., in accordance with Eq. 3 above).

Figure 3:
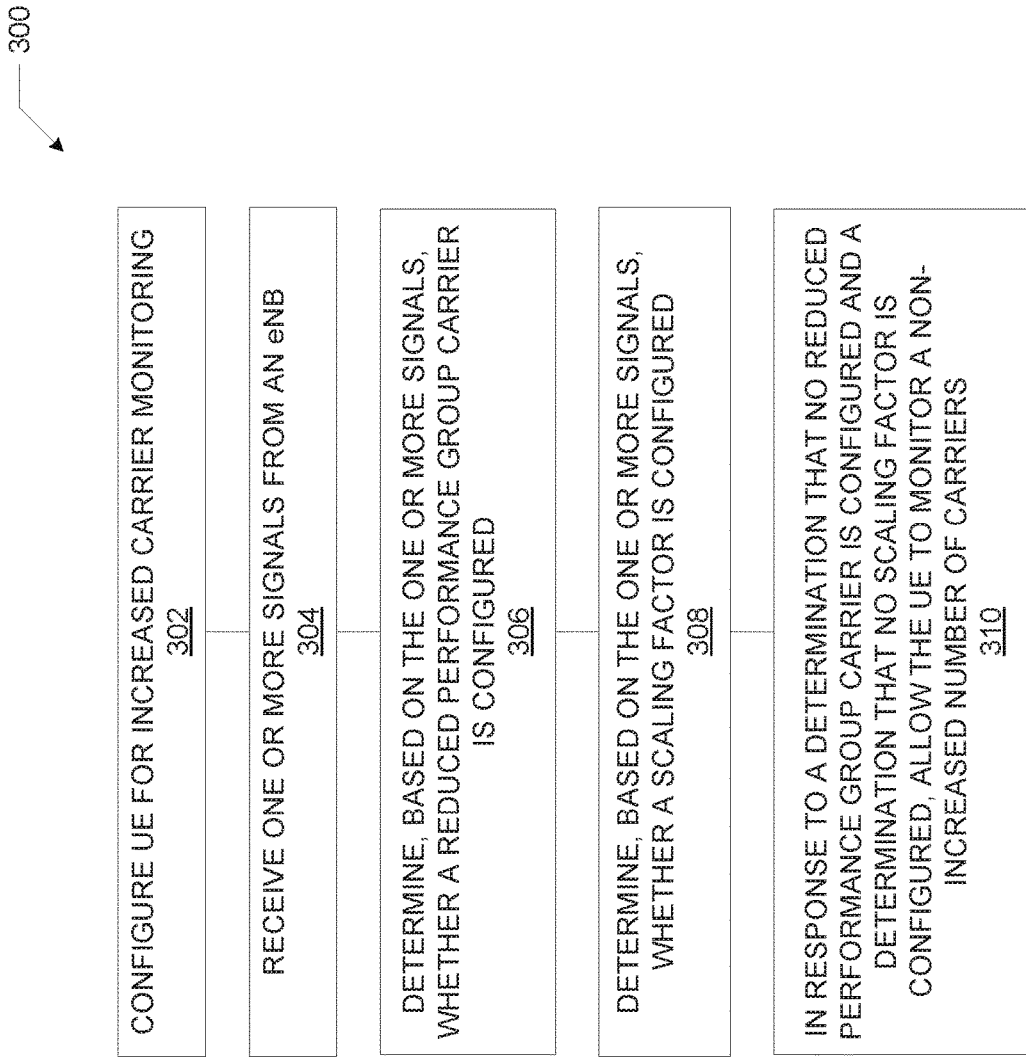
FIG. 3 is a flow diagram of a process for operating a UE in accordance with some embodiments.

FIG. 3 is a flow diagram of a process 300 for operating a UE. For ease of illustration, the process 300 may be discussed below with reference to the UE 102. For illustrative purposes, operations of the process 300 may be described as performed by the carrier monitoring control circuitry 104 of the UE 102, but the process 300 may be performed by any suitably configured device (e.g., a programmed processing system, an ASIC, or another wireless computing device).

At 302, the carrier monitoring control circuitry 104 may configure the UE 102 to support increased carrier monitoring. In some embodiments, increased carrier monitoring may require the UE 102 to monitor the number and type of carriers discussed above. For example, increased carrier monitoring may require the UE 102 to monitor more than four E-UTRA or UTRA FDD carriers, and/or more than four E-UTRA or UTRA TDD carriers.

At 304, the carrier monitoring control circuitry 104 may receive, via the radio control circuitry 106, one or more signals from an eNB. The one or more signals may indicate whether an RPG carrier is configured and whether a scaling factor is configured. For example, when the eNB is the legacy eNB 122, signals from the eNB 122 may not indicate that an RPG carrier is configured and may not indicate that a scaling factor is configured. When the eNB is the eNB 112, signals from the eNB 112 may indicate whether an RPG carrier is configured, and may indicate a value for the scaling factor.

At 306, the carrier monitoring control circuitry 104 may determine, based on the one or more signals from the eNB, whether an RPG carrier is configured. For example, if the UE 102 receives a System Information Block configured as described above with reference to the System Information Block of Table 5, the carrier monitoring control circuitry 104 may process the information contained therein to determine whether an RPG carrier is configured. In another example, if the UE 102 does not receive any signal from an eNB indicating that an RPG is configured, the carrier monitoring control circuitry 104 may determine that no RPG is configured.

At 308, the carrier monitoring control circuitry 104 may determine, based on the one or more signals from the eNB, whether a scaling factor is configured. For example, if the UE 102 receives a MeasScaleFactor information element as described above with reference to the MeasScaleFactor information element of Table 7, the carrier monitoring control circuitry 104 may process the information contained therein to determine whether a scaling factor is configured. In another example, if the UE 102 does not receive any signal from an eNB indicating that a scaling factor is configured, the carrier monitoring control circuitry 104 may determine that no scaling factor is configured.

At 310, the carrier monitoring control circuitry 104 may, in response to a determination that no RPG carrier is configured and a determination that no scaling factor is configured, allow the UE 102 to monitor a non-increased number of carriers. For example, the UE 102 may be allowed to monitor four or fewer E-UTRA or UTRA FDD carriers and/or four or fewer E-UTRA or UTRA TDD carriers.

Figure 4:
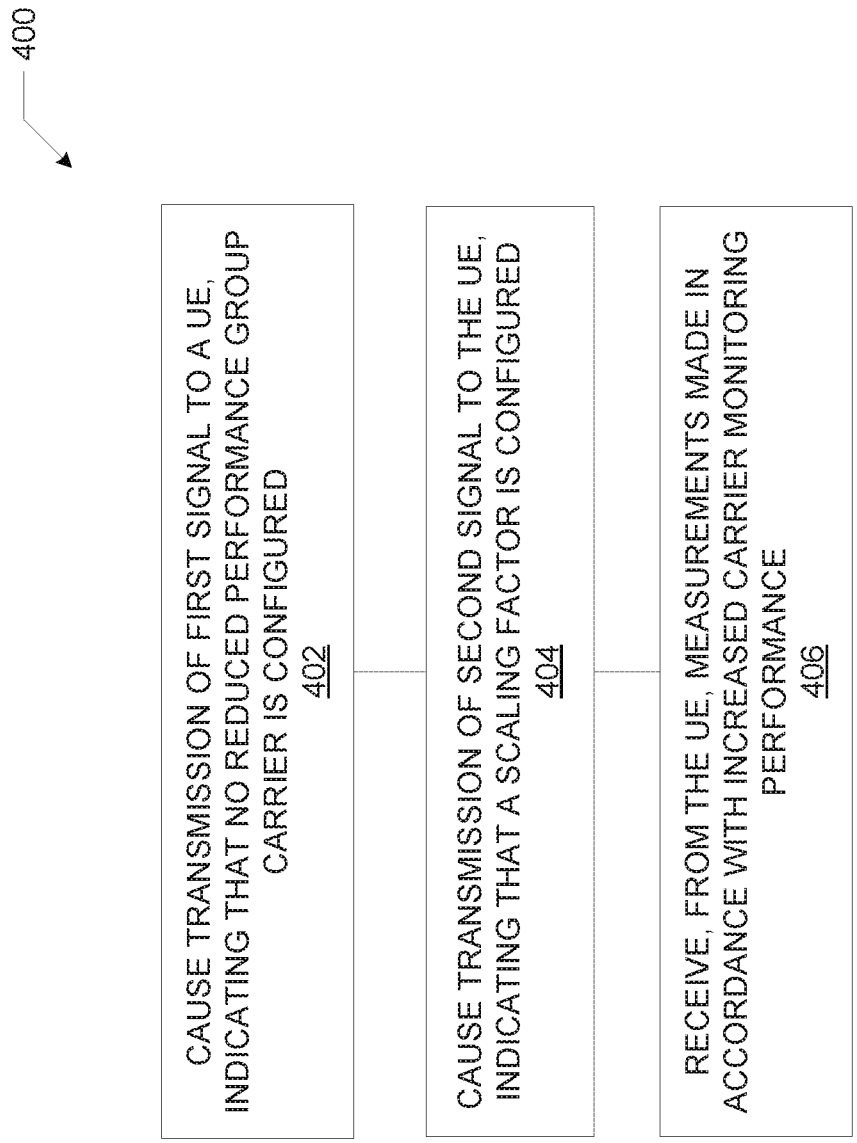
FIG. 4 is a flow diagram of a process for operating an eNB in accordance with some embodiments.

FIG. 4 is a flow diagram of a process 400 for operating an eNB. For ease of illustration, the process 400 may be discussed below with reference to the eNB 112 in communication with the UE 102. For illustrative purposes, operations of the process 400 may be described as performed by the carrier monitoring control circuitry 114 of the eNB 112, but the process 400 may be performed by any suitably configured device (e.g., a programmed processing system, an ASIC, or another wireless computing device).

At 402, the carrier monitoring control circuitry 114 may cause transmission, via the radio control circuitry 116, of a first signal to the UE 102. The UE 102 may support increased carrier monitoring performance, and the first signal may indicate that no RPG carrier is configured. For example, the carrier monitoring control circuitry 114 may cause the transmission of a System Information Block configured as described above with reference to the System Information Block of Table 5, wherein the information in the System Information Block indicates that no RPG is configured.

At 404, the carrier monitoring control circuitry 114 may cause transmission, via the radio control circuitry 116, of a second signal to the UE 102. The second signal may indicate that a scaling factor is configured. For example, the carrier monitoring control circuitry 114 may cause the transmission of a MeasScaleFactor information element as described above with reference to the MeasScaleFactor information element of Table 7, wherein the information in the MeasScaleFactor information element indicates the value of the scaling factor.

At 406, the carrier monitoring control circuitry 114 may receive, from the UE 102 via the radio control circuitry 116, measurements made by the UE in accordance with increased carrier monitoring.

For example, the UE 102 may be required to monitor more than four E-UTRA or UTRA FDD carriers and/or more than four E-UTRA or UTRA TDD carriers.

In the process 400, if the UE 102 did not support increased carrier monitoring, receipt of the indication of no RPG carriers and receipt of the indication of a scaling factor may not cause the UE 102 to make measurements in accordance with increased carrier monitoring performance. Instead, since increased carrier monitoring is not supported, the UE 102 may simply make measurements in accordance with non-increased carrier monitoring.

Figure 5:
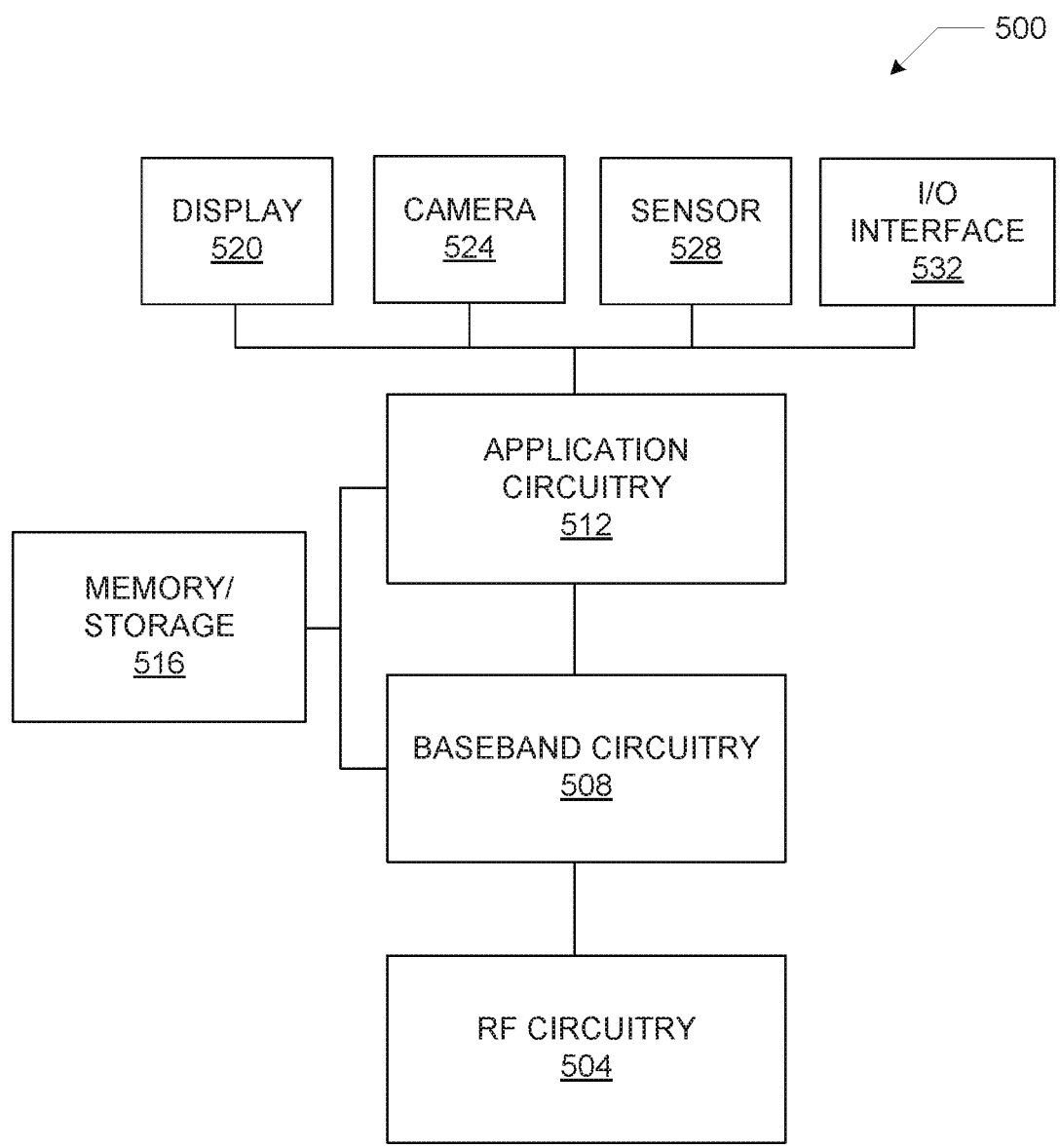
FIG. 5 is a block diagram of an example system that may be used to practice various embodiments described herein.

The UE 102 or eNB 112 as described herein may be implemented into a system using any suitable hardware, firmware, or software configured as desired. FIG. 5 illustrates, for one embodiment, an example system 500 comprising radio frequency (RF) circuitry 504, baseband circuitry 508, application circuitry 512, memory/storage 516, display 520, camera 524, sensor 528, input/output (I/O) interface 532, or network interface 536 coupled with each other as shown. In some embodiments, the RF circuitry 504 and the baseband circuitry 508 may be included in the radio hardware 108 or the radio hardware 118 for the UE 102 or the eNB 112, respectively. In some embodiments, the application circuitry 512 may be included in the carrier monitoring control circuitry 104 or the carrier monitoring control circuitry 114 for the UE 102 or the eNB 112, respectively. Other circuitry of the system 500 may be included in the other circuitry 110 or the other circuitry 120 of the UE 102 or the eNB 112, respectively.

The application circuitry 512 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 516 and configured to execute instructions stored in the memory/storage 516 to enable various applications or operating systems running on the system 500.

The baseband circuitry 508 may include circuitry such as, but not limited to, one or more single-core or multi-core processors such as, for example, a baseband processor. The baseband circuitry 508 may handle various radio control functions that enable communication with one or more radio access networks via the RF circuitry 504. The radio control functions may include, but are not limited to, signal modulation, encoding, decoding, radio frequency shifting, etc. In some embodiments, the baseband circuitry 508 may provide for communication compatible with one or more radio technologies. For example, in some embodiments, the baseband circuitry 508 may support communication with an E-UTRAN or other wireless metropolitan area networks (WMAN), a wireless local area network (WLAN), or a wireless personal area network (WPAN). Embodiments in which the baseband circuitry 508 is configured to support radio communications of more than one wireless protocol may be referred to as multi-mode baseband circuitry.

In various embodiments, baseband circuitry 508 may include circuitry to operate with signals that are not strictly considered as being in a baseband frequency. For example, in some embodiments, baseband circuitry 508 may include circuitry to operate with signals having an intermediate frequency, which is between a baseband frequency and a radio frequency.

The RF circuitry 504 may enable communication with wireless networks using modulated electromagnetic radiation through a non-solid medium. In various embodiments, the RF circuitry 504 may include switches, filters, amplifiers, etc., to facilitate the communication with the wireless network.

In various embodiments, RF circuitry 504 may include circuitry to operate with signals that are not strictly considered as being in a radio frequency. For example, in some embodiments, RF circuitry 504 may include circuitry to operate with signals having an intermediate frequency between a baseband frequency and a radio frequency.

In some embodiments, some or all of the constituent components of the baseband circuitry 508, the application circuitry 512, or the memory/storage 516 may be implemented together on a system on a chip (SOC).

The memory/storage 516 may be used to load and store data or instructions, for example, for the system 500. For example, the memory/storage 516 may provide one or more computer-readable media (e.g., non-transitory computer-readable media) having instructions thereon that, in response to execution by one or more processing devices of the system 500, cause the system 500 to perform any suitable process (e.g., any of the processes disclosed herein). The memory/storage 516 for one embodiment may include any combination of suitable volatile memory (e.g., dynamic random access memory (DRAM)) or non-volatile memory (e.g., Flash memory).

In various embodiments, the I/O interface 532 may include one or more user interfaces designed to enable user interaction with the system 500 or peripheral component interfaces designed to enable peripheral component interaction with the system 500. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 528 may include one or more sensing devices to determine environmental conditions or location information related to the system 500. In some embodiments, the sensors may include, but are not limited to, a gyro sensor, an accelerometer, a proximity sensor, an ambient light sensor, and a positioning unit. The positioning unit may also be part of, or interact with, the baseband circuitry 508 or RF circuitry 504 to communicate with components of a positioning network, e.g., a global positioning system (GPS) satellite.

In various embodiments, the display 520 may include a display (e.g., a liquid crystal display, a touch screen display, etc.). In various embodiments, the network interface 536 may include circuitry to communicate over one or more wired networks.

In various embodiments, the system 500 may be a mobile computing device such as, but not limited to, a laptop computing device, a tablet computing device, a netbook, an ultrabook, a smartphone, etc. In various embodiments, the system 500 may have more or fewer components, or different architectures.

The following paragraphs illustrate examples of various embodiments disclosed herein.

Example 1 may include configuration, by one or more network devices (such as an eNB) of at least one reduced performance group carrier, in response to which a UE may use the presence of a scaling factor or the presence of the reduced performance group carrier to determine if the network supports increased carrier monitoring or not, and may apply the corresponding performance delay requirement accordingly.

Example 2 may include the subject matter of Example 1, and may further include configuration, by the one or more network devices, of the scaling factor when all carriers are configured as NPG, in response to which the UE may still follow all NPG requirements and may not apply the scaling factor.

Example 3 may include the subject matter of Example 1, and may further include the UE following the performance requirements of all carriers configured as NPG with the scaling factor present (i.e., the UE should not apply the scaling factor to measurements).

Example 4 may include the subject matter of any of Examples 1-3, and may further include using a "none" value in the scaling factor to indicate that all carriers are NPG.

Example 5 may include the subject matter of any of Examples 1-4, and may further include the network being required to configure the scaling factor and an inter-freq list at the same time (i.e., using InterFreqCarrierFreqInfo-r12).

Example 6 may include the subject matter of any of Examples 1-5, and may further specify that "measScaleFactor-r12 MeasScaleFactor-r12" should be "OPTIONAL, —Need OR" instead of "OPTIONAL, —Need ON."

Example 7 may include the subject matter of any of Examples 1-6, and may further specify that "measScaleFactor-r12 MeasScaleFactor-r12" should be non-optional.

Example 8 is a method for network device operation, including configuring, by the network device of a wireless network, at least one reduced performance group carrier; and signaling, to a UE, a scaling factor; wherein, in response, a UE may use the presence of the scaling factor or the presence of the reduced performance group carrier to determine if the wireless network supports increased carrier monitoring or not.

Example 9 may include the subject matter of Example 8, and may further specify that the UE, in response, may apply a corresponding performance delay requirement accordingly.

Example 10 may include the subject matter of any of Examples 8-9, and may further include configuring, by the network device, the scaling factor when all carriers are configured as NPG, in response to which the UE may still follow all NPG requirements and may not apply the scaling factor.

Example 11 may include the subject matter of any of Examples 8-10, and may further specify that configuring the scaling factor includes using a "none" value for the scaling factor to indicate that all carriers are NPG.

Example 12 may include the subject matter of any of Examples 8-11, and may further configuring, by the network device, the scaling factor and an inter-frequency list at the same time.

Example 13 may include the subject matter of Example 12, and may further specify that the scaling factor and the inter-frequency list are configured using InterFreqCarrierFreqInfo-r12.

Example 14 may include the subject matter of any of Examples 8-13, and may further specify that "measScaleFactor-r12 MeasScaleFactor-r12" is "OPTIONAL, —Need OR."

Example 15 may include the subject matter of any of Examples 8-14, and may further specify that "measScaleFactor-r12 MeasScaleFactor-r12" is non-optional.

Example 16 is a user equipment (UE) including: radio control circuitry to couple with radio hardware for wireless communications with an eNB; and carrier monitoring control circuitry, coupled with the radio control circuitry, to: configure the UE to support increased carrier monitoring, wherein increased carrier monitoring requires the UE to monitor more than four radio access technology (RAT) frequency division duplex (FDD) carriers, and wherein the RAT is Evolved Universal Terrestrial Radio Access (E-UTRA) or Universal Terrestrial Radio Access (UTRA); determine, based on one or more signals received from the eNB, whether a reduced performance group carrier is configured; determine, based on the one or more signals received from the eNB, whether a scaling factor is configured; and in response to a determination that no reduced performance group carrier is configured and a determination that no scaling factor is configured, allow the UE to monitor four or fewer RAT FDD carriers.

Example 17 may include the subject matter of Example 16, and may further specify that: increased carrier monitoring further requires the UE to monitor more than four RAT time division duplex (TDD) carriers; and the carrier monitoring control circuitry is to, in response to a determination that no reduced performance group carrier is configured and a determination that no scaling factor is configured, allow the UE to monitor four or fewer RAT TDD carriers.

Example 18 may include the subject matter of any of Examples 16-17, and may further specify that the carrier monitoring control circuitry is to, in response to a determination that no reduced performance group carrier is configured and a determination that a scaling factor is configured, require the UE to monitor more than four RAT FDD carriers.

Example 19 may include the subject matter of any of Examples 16-18, and may further specify that the scaling factor defines a relaxation to be applied to measurements for reduced performance group carriers.

Example 20 may include the subject matter of Example 19, and may further specify that the carrier monitoring control circuitry is to, in response to a determination that one or more reduced performance group carriers are configured and a determination that a scaling factor is configured, require the UE to monitor the one or more reduced performance group carrier based at least in part on the scaling factor.

Example 21 may include the subject matter of any of Examples 16-20, and may further specify that increased carrier monitoring requires the UE to monitor at least eight RAT FDD carriers.

Example 22 may include the subject matter of any of Examples 16-21, and may further specify that the carrier monitoring control circuitry is to determine whether a reduced performance group carrier is configured based on a reduced measurement performance field of an information element.

Example 23 may include the subject matter of any of Examples 16-22, and may further specify that the carrier monitoring control circuitry is to determine whether a scaling factor is configured based on a MeasScaleFactor information element.

Example 24 may include the subject matter of any of Examples 16-23, and may further include a global positioning system receiver.

Example 25 is one or more non-transitory computer-readable media having instructions thereon that, in response to execution by one or more processing devices of a user equipment (UE), cause the UE to: determine, based on one or more signals received by the UE from an eNB, whether a reduced performance group carrier is configured, wherein the UE supports increased carrier monitoring, increased carrier monitoring requires the UE to monitor more than four radio access technology (RAT) frequency division duplex (FDD) carriers, and wherein the RAT is Evolved Universal Terrestrial Radio Access (E-UTRA) or Universal Terrestrial Radio Access (UTRA); determine, based on the one or more signals received from the eNB, whether a scaling factor is configured; and in response to a determination that no reduced performance group carrier is configured and a determination that no scaling factor is configured, allow the UE to monitor four or fewer RAT FDD carriers.

Example 26 may include the subject matter of Example 25, and may further specify that the one or more signals includes a MeasScaleFactor information element that indicates that the scaling factor is configured.

Example 27 may include the subject matter of any of Examples 25-26, and may further specify that the scaling factor defines a relaxation to be applied to measurements for reduced performance group carriers.

Example 28 may include the subject matter of Example 27, and may further specify that the instructions are further to, in response to execution by the one or more processing devices of the UE, cause the UE to: receive an additional signal, from the eNB, that indicates that one or more reduced performance group carriers are configured; and provide, to the eNB in response to the additional signal, measurements of the one or more reduced performance group carriers made in accordance with the scaling factor.

Example 29 is an eNB, including: radio control circuitry to couple with radio hardware for wireless communications; and carrier monitoring control circuitry, coupled with the radio control circuitry, to: cause transmission of a first signal to a user equipment (UE), wherein the first signal indicates that no reduced performance group carrier is configured, the UE is configured to support increased carrier monitoring, increased carrier monitoring requires the UE to monitor more than four radio access technology (RAT) frequency division duplex (FDD) carriers, and the RAT is Evolved Universal Terrestrial Radio Access (E-UTRA) or Universal Terrestrial Radio Access (UTRA); cause transmission of a second signal to the UE, wherein the second signal indicates that a scaling factor is configured; and receive, from the UE, increased carrier monitoring measurements, wherein the increased carrier monitoring measurements include measurements of more than four RAT FDD carriers, wherein the UE performs the increased carrier monitoring measurements in response to receipt of the first and second signals.

Example 30 may include the subject matter of Example 29, and may further specify that the second signal includes a MeasScaleFactor information element that indicates that a scaling factor is configured.

Example 31 may include the subject matter of any of Examples 29-30, and may further specify that the scaling factor defines a relaxation to be applied to measurements for reduced performance group carriers.

Example 32 may include the subject matter of Example 31, and may further specify that the carrier monitoring control circuitry is to: cause transmission of a third signal to the UE, wherein the third signal indicates that one or more reduced performance group carriers are configured; and receive, from the UE, in response to the third signal, measurements of the one or more reduced performance group carriers made in accordance with the scaling factor.

Example 33 may include the subject matter of any of Examples 29-32, and may further include radio hardware including an antenna.

Example 34 is one or more non-transitory computer-readable media having instructions thereon that, in response to execution by one or more processing devices of an eNB, cause the eNB to: cause transmission of a first signal to a user equipment (UE), wherein the first signal indicates that no reduced performance group carrier is configured, the UE is configured to support increased carrier monitoring, increased carrier monitoring requires the UE to monitor more than four radio access technology (RAT) frequency division duplex (FDD) carriers, and the RAT is Evolved Universal Terrestrial Radio Access (E-UTRA) or Universal Terrestrial Radio Access (UTRA); cause transmission of a second signal to the UE, wherein the second signal indicates that a scaling factor is configured; and receive, from the UE in response to receipt of the first and second signals, increased carrier monitoring measurements.

Example 35 may include the subject matter of Example 34, and may further specify that the increased carrier monitoring measurements include measurements of more than four RAT FDD carriers.

Example 36 may include the subject matter of any of Examples 34-35, and may further specify that: increased carrier monitoring further requires the UE to monitor more than four RAT time division duplex (TDD) carriers; and the instructions further cause the eNB to, in response to execution by the one or more processing devices of the eNB, receive measurement from the UE of four or fewer RAT TDD carriers.

Example 37 may include the subject matter of any of Examples 34-36, and may further specify that increased carrier monitoring requires the UE to monitor at least eight RAT FDD carriers.

Example 38 may include the subject matter of any of Examples 34-37, and may further specify that the first signal includes a reduced measurement performance field of an information element.

Example 39 may include the subject matter of any of Examples 34-38, and may further specify that the second signal includes a MeasScaleFactor information element.

Example 40 may include the subject matter of Example 39, and may further specify that the MeasScaleFactor information element is non-optional.

Example 41 is a method for wireless communication including: configuring, by a user equipment (UE), the UE to support increased carrier monitoring, wherein increased carrier monitoring requires the UE to monitor more than four radio access technology (RAT) frequency division duplex (FDD) carriers, and wherein the RAT is Evolved Universal Terrestrial Radio Access (E-UTRA) or Universal Terrestrial Radio Access (UTRA); determining, by the UE, based on one or more signals received from the eNB, whether a reduced performance group carrier is configured; determining, by the UE, based on the one or more signals received from the eNB, whether a scaling factor is configured; and in response to a determination that no reduced performance group carrier is configured and a determination that no scaling factor is configured, allowing, by the UE, the UE to monitor four or fewer RAT FDD carriers.

Example 42 may include the subject matter of Example 41, and may further specify that: increased carrier monitoring further requires the UE to monitor more than four RAT time division duplex (TDD) carriers; and that the method further includes, in response to a determination that no reduced performance group carrier is configured and a determination that no scaling factor is configured, allowing, by the UE, the UE to monitor four or fewer RAT TDD carriers.

Example 43 may include the subject matter of any of Examples 41-42, and may further include, in response to a determination that no reduced performance group carrier is configured and a determination that a scaling factor is configured, requiring, by the UE, the UE to monitor more than four RAT FDD carriers.

Example 44 may include the subject matter of any of Examples 41-43, and may further specify that the scaling factor defines a relaxation to be applied to measurements for reduced performance group carriers.

Example 45 may include the subject matter of Example 44, and may further include, in response to a determination that one or more reduced performance group carriers are configured and a determination that a scaling factor is configured, requiring, by the UE, the UE to monitor the one or more reduced performance group carrier based at least in part on the scaling factor.

Example 46 may include the subject matter of any of Examples 41-45, and may further specify that increased carrier monitoring requires the UE to monitor at least eight RAT FDD carriers.

Example 47 may include the subject matter of any of Examples 41-46, and may further include determining, by the UE, whether a reduced performance group carrier is configured based on a reduced measurement performance field of an information element.

Example 48 may include the subject matter of any of Examples 41-47, and may further include determining, by the UE, whether a scaling factor is configured based on a MeasScaleFactor information element.

Example 49 may include the subject matter of any of Examples 41-48, and may further include operating by the UE, a global positioning system receiver.

Example 50 is a method for wireless communication, including: determining, by a user equipment (UE), based on one or more signals received by the UE from an eNB, whether a reduced performance group carrier is configured, wherein the UE supports increased carrier monitoring, increased carrier monitoring requires the UE to monitor more than four frequency division duplex (FDD) carriers; determining, by the UE, based on the one or more signals received from the eNB, whether a scaling factor is configured; and in response to a determination that no reduced performance group carrier is configured and a determination that no scaling factor is configured, allowing, by the UE, the UE to monitor four or fewer RAT FDD carriers.

Example 51 may include the subject matter of Example 50, and may further specify that the one or more signals includes a MeasScaleFactor information element that indicates that the scaling factor is configured.

Example 52 may include the subject matter of any of Examples 50-51, and may further specify that the scaling factor defines a relaxation to be applied to measurements for reduced performance group carriers.

Example 53 may include the subject matter of Example 52, and may further include receiving, by the UE, an additional signal, from the eNB, that indicates that one or more reduced performance group carriers are configured; and providing, by the UE, to the eNB in response to the additional signal, measurements of the one or more reduced performance group carriers made in accordance with the scaling factor.

Example 54 is a method for wireless communication, including: causing, by an eNB, transmission of a first signal to a user equipment (UE), wherein the first signal indicates that no reduced performance group carrier is configured, the UE is configured to support increased carrier monitoring, increased carrier monitoring requires the UE to monitor more than four radio access technology (RAT) frequency division duplex (FDD) carriers, and the RAT is Evolved Universal Terrestrial Radio Access (E-UTRA) or Universal Terrestrial Radio Access (UTRA); causing, by the eNB, transmission of a second signal to the UE, wherein the second signal indicates that a scaling factor is configured; and receiving, by the eNB, from the UE, increased carrier monitoring measurements, wherein the increased carrier monitoring measurements include measurements of more than four RAT FDD carriers, wherein the UE performs the increased carrier monitoring measurements in response to receipt of the first and second signals.

Example 55 may include the subject matter of Example 54, and may further specify that the second signal includes a MeasScaleFactor information element that indicates that a scaling factor is configured.

Example 56 may include the subject matter of any of Examples 54-55, and may further specify that the scaling factor defines a relaxation to be applied to measurements for reduced performance group carriers.

Example 57 may include the subject matter of Example 56, and may further include causing, by the eNB, transmission of a third signal to the UE, wherein the third signal indicates that one or more reduced performance group carriers are configured; and receiving, by the eNB, from the UE, in response to the third signal, measurements of the one or more reduced performance group carriers made in accordance with the scaling factor.

Example 58 may include the subject matter of any of Examples 54-57, and may further include operating radio hardware, wherein the radio hardware includes an antenna.

Example 59 is a method for wireless communication, including: causing, by an eNB, transmission of a first signal to a user equipment (UE), wherein the first signal indicates that no reduced performance group carrier is configured, the UE is configured to support increased carrier monitoring, increased carrier monitoring requires the UE to monitor more than four frequency division duplex (FDD) carriers; causing, by the eNB, transmission of a second signal to the UE, wherein the second signal indicates that a scaling factor is configured; and receiving, by the eNB, from the UE in response to receipt of the first and second signals, increased carrier monitoring measurements.

Example 60 may include the subject matter of Example 59, and may further specify that the increased carrier monitoring measurements include measurements of more than four RAT FDD carriers.

Example 61 may include the subject matter of any of Examples 59-60, and may further specify that: increased carrier monitoring further requires the UE to monitor more than four RAT time division duplex (TDD) carriers; and the method further includes receiving, by the eNB, measurement from the UE of four or fewer RAT TDD carriers.

Example 62 may include the subject matter of any of Examples 59-61, and may further specify that increased carrier monitoring requires the UE to monitor at least eight RAT FDD carriers.

Example 63 may include the subject matter of any of Examples 59-62, and may further specify that the first signal includes a reduced measurement performance field of an information element.

Example 64 may include the subject matter of any of Examples 59-63, and may further specify that the second signal includes a MeasScaleFactor information element.

Example 65 may include the subject matter of Example 64, and may further specify that the MeasScaleFactor information element is non-optional.

Example 66 is a user equipment (UE) for wireless communication including: means for configuring the UE to support increased carrier monitoring, wherein increased carrier monitoring requires the UE to monitor more than four radio access technology (RAT) frequency division duplex (FDD) carriers, and wherein the RAT is Evolved Universal Terrestrial Radio Access (E-UTRA) or Universal Terrestrial Radio Access (UTRA); means for determining, based on one or more signals received from the eNB, whether a reduced performance group carrier is configured; determining, by the UE, based on the one or more signals received from the eNB, whether a scaling factor is configured; and means for, in response to a determination that no reduced performance group carrier is configured and a determination that no scaling factor is configured, allowing the UE to monitor four or fewer RAT FDD carriers.

Example 67 may include the subject matter of Example 66, and may further specify that: increased carrier monitoring further requires the UE to monitor more than four RAT time division duplex (TDD) carriers; and that the UE further includes means for, in response to a determination that no reduced performance group carrier is configured and a determination that no scaling factor is configured, allowing the UE to monitor four or fewer RAT TDD carriers.

Example 68 may include the subject matter of any of Examples 66-67, and may further include means for, in response to a determination that no reduced performance group carrier is configured and a determination that a scaling factor is configured, requiring the UE to monitor more than four RAT FDD carriers.

Example 69 may include the subject matter of any of Examples 66-68, and may further specify that the scaling factor defines a relaxation to be applied to measurements for reduced performance group carriers.

Example 70 may include the subject matter of Example 69, and may further include means for, in response to a determination that one or more reduced performance group carriers are configured and a determination that a scaling factor is configured, requiring the UE to monitor the one or more reduced performance group carrier based at least in part on the scaling factor.

Example 71 may include the subject matter of any of Examples 66-70, and may further specify that increased carrier monitoring requires the UE to monitor at least eight RAT FDD carriers.

Example 72 may include the subject matter of any of Examples 66-71, and may further include means for determining whether a reduced performance group carrier is configured based on a reduced measurement performance field of an information element.

Example 73 may include the subject matter of any of Examples 66-72, and may further include means for determining whether a scaling factor is configured based on a MeasScaleFactor information element.

Example 74 may include the subject matter of any of Examples 66-73, and may further include means for operating a global positioning system receiver.

Example 75 is a user equipment (UE), including: means for determining based on one or more signals received by the UE from an eNB, whether a reduced performance group carrier is configured, wherein the UE supports increased carrier monitoring, increased carrier monitoring requires the UE to monitor more than four frequency division duplex (FDD) carriers; means for determining based on the one or more signals received from the eNB, whether a scaling factor is configured; and means for, in response to a determination that no reduced performance group carrier is configured and a determination that no scaling factor is configured, allowing the UE to monitor four or fewer RAT FDD carriers.

Example 76 may include the subject matter of Example 75, and may further specify that the one or more signals includes a MeasScaleFactor information element that indicates that the scaling factor is configured.

Example 77 may include the subject matter of any of Examples 75-76, and may further specify that the scaling factor defines a relaxation to be applied to measurements for reduced performance group carriers.

Example 78 may include the subject matter of Example 77, and may further include means for receiving an additional signal, from the eNB, that indicates that one or more reduced performance group carriers are configured; and means for providing, to the eNB in response to the additional signal, measurements of the one or more reduced performance group carriers made in accordance with the scaling factor.

Example 79 is an eNB, including: means for causing transmission of a first signal to a user equipment (UE), wherein the first signal indicates that no reduced performance group carrier is configured, the UE is configured to support increased carrier monitoring, increased carrier monitoring requires the UE to monitor more than four radio access technology (RAT) frequency division duplex (FDD) carriers, and the RAT is Evolved Universal Terrestrial Radio Access (E-UTRA) or Universal Terrestrial Radio Access (UTRA); means for causing transmission of a second signal to the UE, wherein the second signal indicates that a scaling factor is configured; and means for receiving, from the UE, increased carrier monitoring measurements, wherein the increased carrier monitoring measurements include measurements of more than four RAT FDD carriers, wherein the UE performs the increased carrier monitoring measurements in response to receipt of the first and second signals.

Example 80 may include the subject matter of Example 79, and may further specify that the second signal includes a MeasScaleFactor information element that indicates that a scaling factor is configured.

Example 81 may include the subject matter of any of Examples 79-80, and may further specify that the scaling factor defines a relaxation to be applied to measurements for reduced performance group carriers.

Example 82 may include the subject matter of Example 81, and may further include means for causing transmission of a third signal to the UE, wherein the third signal indicates that one or more reduced performance group carriers are configured; and means for receiving, from the UE, in response to the third signal, measurements of the one or more reduced performance group carriers made in accordance with the scaling factor.

Example 83 may include the subject matter of any of Examples 79-82, and may further include means for operating radio hardware, wherein the radio hardware includes an antenna.

Example 84 is an eNB, including: means for causing transmission of a first signal to a user equipment (UE), wherein the first signal indicates that no reduced performance group carrier is configured, the UE is configured to support increased carrier monitoring, increased carrier monitoring requires the UE to monitor more than four frequency division duplex (FDD) carriers; means for causing transmission of a second signal to the UE, wherein the second signal indicates that a scaling factor is configured; and means for receiving, from the UE in response to receipt of the first and second signals, increased carrier monitoring measurements.

Example 85 may include the subject matter of Example 84, and may further specify that the increased carrier monitoring measurements include measurements of more than four RAT FDD carriers.

Example 86 may include the subject matter of any of Examples 84-85, and may further specify that: increased carrier monitoring further requires the UE to monitor more than four RAT time division duplex (TDD) carriers; and the eNB further includes means for receiving measurement from the UE of four or fewer RAT TDD carriers.

Example 87 may include the subject matter of any of Examples 84-86, and may further specify that increased carrier monitoring requires the UE to monitor at least eight RAT FDD carriers.

Example 88 may include the subject matter of any of Examples 84-87, and may further specify that the first signal includes a reduced measurement performance field of an information element.

Example 89 may include the subject matter of any of Examples 84-88, and may further specify that the second signal includes a MeasScaleFactor information element.

Example 90 may include the subject matter of Example 89, and may further specify that the MeasScaleFactor information element is non-optional.

Example 91 may include an apparatus comprising means to perform the elements of the method or process of any of Examples 1-15 and 41-65, or any other method or process described herein.

Example 92 may include one or more non-transitory computer-readable media comprising instructions to cause an electronic device, upon execution of the instructions by one or more processors of the electronic device, to perform the one or more elements of the method or process of any of Examples 1-15 and 41-65, or any other method or process described herein.

Example 93 may include an apparatus comprising control circuitry, transmit circuitry, and/or receive circuitry to perform one or more elements of the method or process of any of Examples 1-15 and 41-65, or any other method or process described herein.

Example 94 may include any of the methods of communicating in a wireless network shown and described herein.

Example 95 may include any of the systems for providing wireless communication shown and described herein.

Example 96 may include any of the devices for providing wireless communication shown and described herein.

What is claimed is:

1. One or more non-transitory computer-readable storage media having instructions that, when executed by one or more processors, are to cause a user equipment (UE) to:

identify a scaling factor in a scaling factor (measScaleFactor) information element (IE) of a radio resource control (RRC) message;

generate measurements for carriers belonging to a first performance group that has a first measurement delay that is greater than a second measurement delay of a second performance group, wherein the carriers belonging to the first performance group are to be monitored according to a first carrier monitoring capability that is increased relative to a second carrier monitoring capability; and apply the scaling factor to the measurements.

2. The one or more non-transitory computer-readable storage media of claim 1, wherein the instructions, when executed, are to cause the UE to:

signal an indication to indicate that the UE supports an Evolved Universal Terrestrial Radio Access (E-UTRA) first carrier monitoring capability or a Universal Terrestrial Radio Access (UTRA) first carrier monitoring capability.

3. The one or more non-transitory computer-readable storage media of claim 1, wherein the measScaleFactor IE is a first measScaleFactor IE and the RRC message is a first RRC message, and wherein the instructions, when executed, are to cause the UE to:

control receipt of a second RRC message; and monitor carriers according to the second carrier monitoring capability based on a determination that a scaling factor is not included in a second measScaleFactor IE of the second RRC message and further based on the UE support of the first carrier monitoring capability.

4. The one or more non-transitory computer-readable storage media of claim 1, wherein the scaling factor included in the measScaleFactor IE comprises a value of 8 or 16.

5. The one or more non-transitory computer-readable storage media of claim 1, wherein the measScaleFactor IE is included in a measurement configuration (MeasConfig) IE of the RRC message.

6. The one or more non-transitory computer-readable storage media of claim 1, wherein the instructions, when executed, are to cause the UE to:

monitor carriers belonging to the first performance group based further on a determination that a reduced measurement performance (reducedMeasPerformance) IE of an obtained system information block (SIB) includes a value of true; or monitor carriers belonging to the second performance group when the reducedMeasPerformance IE of the obtained SIB includes a value of false, or when the obtained SIB does not include the reducedMeasPerformance IE.

7. The one or more non-transitory computer-readable storage media of claim 6, wherein the SIB is an SIB type 6.

8. The one or more non-transitory computer-readable storage media of claim 1, wherein the scaling factor defines a relaxation to be applied to requirements for measured carriers belonging to the first performance group.

9. An apparatus to be implemented in a user equipment (UE), the apparatus comprising:

radio frequency (RF) circuitry to receive a radio resource control (RRC) message including a scaling factor (measScaleFactor) information element (IE), the measScaleFactor IE to include a scaling factor that defines a relaxation to be applied to requirements for carriers to be measured with reduced measurement performance relative to measurement performance of other measured carriers; and processor circuitry coupled with the RF circuitry, the processor circuitry to: identify, based on information in the RRC message, carriers belonging to a reduced performance group based on a determination that a scaling factor is included in the measScaleFactor IE, wherein the carriers belonging to the reduced performance group have a worse measurement delay than measurement delay of carriers belonging to a normal performance group, generate measurements for the identified carriers, wherein the identified carriers are to be monitored according to an increased carrier monitoring capability that is increased relative to a normal carrier monitoring capability, and apply the scaling factor to the generated measurements.

10. The apparatus of claim 9, wherein the processor circuitry is to control the RF circuitry to:

signal an indication to indicate that the UE supports an Evolved Universal Terrestrial Radio Access (E-UTRA) increased carrier monitoring capability or a Universal Terrestrial Radio Access (UTRA) increased carrier monitoring capability.

11. The apparatus of claim 9, wherein the processor circuitry is to control the RF circuitry to:

monitor carriers according to the normal carrier monitoring capability based on a determination that a scaling factor is not included in the measScaleFactor IE and regardless of whether the UE supports the increased carrier monitoring capability.

12. The apparatus of claim 9, wherein the scaling factor included in the measScaleFactor IE comprises a value of 8 or 16.

13. The apparatus of claim 9, wherein the measScaleFactor IE is included in a measurement configuration (MeasConfig) IE of the RRC message.

14. The apparatus of claim 9, wherein the processor circuitry is to control the RF circuitry to:

monitor inter-frequency carriers belonging to the reduced performance group when a reduced measurement performance (reducedMeasPerformance) IE of an obtained system information block (SIB) includes a value of true; or monitor inter-frequency carriers belonging to the normal performance group when the reducedMeasPerformance IE of the obtained SIB includes a value of false, or when the obtained SIB does not include the reducedMeasPerformance IE.

15. The apparatus of claim 14, wherein the SIB is an SIB type 6.

16. One or more non-transitory computer-readable storage media having instructions that, when executed by one or more processors, cause an evolved nodeB (eNB) to:

identify a scaling factor to define a relaxation to be applied to requirements for carriers of a reduced performance group, wherein individual carriers of the reduced performance group have measurement delay that is less than a measurement delay of individual carriers of a normal performance group;

generate a radio resource control (RRC) message comprising a scaling factor (measScaleFactor) information element (IE) indicating the identified scaling factor and measurement object IEs indicating carriers to be measured when a user equipment (UE) indicates support for an increased carrier monitoring capability, the increased carrier monitoring capability indicating that the UE is capable of monitoring an increased number of carriers relative to a number of carriers that other UEs with a normal carrier monitoring capability are capable of monitoring; and control transmission of the RRC message to the UE.

17. The one or more non-transitory computer-readable storage media of claim 16, wherein the instructions, when executed, are to cause the eNB to:

receive, from the UE, an indication that the UE supports an Evolved Universal Terrestrial Radio Access (E-UTRA) increased carrier monitoring capability or a Universal Terrestrial Radio Access (UTRA) increased carrier monitoring capability.

18. The one or more non-transitory computer-readable storage media of claim 16, wherein the instructions, when executed, are to cause the eNB to:

determine that the UE should not monitor carriers belonging to the reduced performance group or should not monitor the increased number of carriers; and generate the RRC message to not include the scaling factor.

19. The one or more non-transitory computer-readable storage media of claim 16, wherein the scaling factor included in the measScaleFactor IE comprises a value of 8 or 16.

20. The one or more non-transitory computer-readable storage media of claim 16, wherein the measScaleFactor IE is included in a measurement configuration (MeasConfig) IE of the RRC message.

21. A system on chip (SoC) to be implemented in a user equipment (UE), the SoC comprising:

baseband circuitry and memory circuitry, the baseband circuitry to: control transmission of an indication that the UE supports an increased carrier monitoring capability that is increased relative to a second carrier monitoring capability, identify a scaling factor in a scaling factor (measScaleFactor) information element (IE) in a measurement configuration (MeasConfig) IE of a radio resource control (RRC) message, wherein the scaling factor defines a relaxation to be applied to requirements for measured carriers belonging to a first performance group, generate measurements for carriers belonging to a reduced performance group, wherein carriers belonging to the reduced performance group have a first measurement delay that is greater than a second measurement delay of carriers belonging to a normal performance group, and apply the scaling factor to the measurements.

22. The SoC of claim 21, wherein the indication is to indicate that the UE supports an Evolved Universal Terrestrial Radio Access (E-UTRA) first carrier monitoring capability or a Universal Terrestrial Radio Access (UTRA) first carrier monitoring capability.

23. The SoC of claim 21, wherein the baseband circuitry is to:

generate measurements for the carriers belonging to the normal performance group and according to a normal carrier monitoring capability when the scaling factor is not included in the measScaleFactor IE of the RRC message.

24. The SoC of claim 21, wherein the scaling factor included in the measScaleFactor IE comprises a value of 8 or 16.

25. The SoC of claim 21, wherein the baseband circuitry is to:

monitor carriers belonging to the first performance group based further on a determination that a reduced measurement performance (reducedMeasPerformance) IE of an obtained system information block (SIB) includes a value of true; or monitor carriers belonging to a second performance group when the reducedMeasPerformance IE of the obtained SIB includes a value of false, or when the obtained SIB does not include the reducedMeasPerformance IE.

26. The SoC of claim 25, wherein the SIB is an SIB type 6.

* * * * *

UNITED STATES PATENT AND TRADEMARK OFFICE
CERTIFICATE OF CORRECTION

PATENT NO. : 9,800,395 B2  
APPLICATION NO. : 15/452153  
DATED : October 24, 2017  
INVENTOR(S) : Candy Yiu et al.

Page 1 of 1

It is certified that error appears in the above-identified patent and that said Letters Patent is hereby corrected as shown below:

In the Claims

Column 27  
Line 63, replace the number "1" before "E" with --I--

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*